«12» United States Patent
Schulz

(10) Patent No.: US 9,088,231 B2
(45) Date of Patent: Jul. 21, 2015

(54) SYSTEM AND METHOD FOR IMPLEMENTING A REMEDIAL ELECTRICAL SHORT

(71) Applicant: GM GLOBAL TECHNOLOGY OPERATIONS LLC, Detroit, MI (US)

(72) Inventor: Steven E. Schulz, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 152 days.

(21) Appl. No.: 13/912,500

(22) Filed: Jun. 7, 2013

(65) Prior Publication Data
US 2014/0361717 A1 Dec. 11, 2014

(51) Int. Cl.
*H02H 7/09* (2006.01)
*H02P 6/08* (2006.01)
*H02P 6/12* (2006.01)
*H02P 27/06* (2006.01)
*H02P 29/02* (2006.01)

(52) U.S. Cl.
CPC .. *H02P 6/08* (2013.01); *H02P 6/12* (2013.01); *H02P 27/06* (2013.01); *H02P 29/022* (2013.01); *H02P 2207/05* (2013.01)

(58) Field of Classification Search
CPC .......... H02P 6/002; H02P 6/185; H02P 6/001
USPC ......... 318/400.22, 801, 139, 800, 400.3, 700, 318/490, 628, 652, 400.33; 363/131
See application file for complete search history.

(56) References Cited

U.S. PATENT DOCUMENTS

2013/0286695 A1* 10/2013 Bachmaier et al. ............. 363/49

* cited by examiner

*Primary Examiner* — Karen Masih
(74) *Attorney, Agent, or Firm* — Quinn Law Group, PLLC

(57) ABSTRACT

A method of implementing a remedial short in a rotating polyphase electric machine (EM) includes detecting a fault condition; and initially commanding a power inverter module (PIM) into an electrically-open state. Once in an open state, a controller may determine a phase angle of a current generated by the rotating EM, and may control the PIM to apply a voltage to the EM that is out-of-phase from the determined phase angle of the generated current. The magnitude of the applied voltage signal may ramped from a first voltage to zero over a period of time; whereafter the PIM may be commanded to electrically couple all of the electrical windings of the EM to each other.

13 Claims, 3 Drawing Sheets

SYSTEM AND METHOD FOR IMPLEMENTING A REMEDIAL ELECTRICAL SHORT

TECHNICAL FIELD

The present disclosure relates to a method and a system for implementing a remedial electrical short.

BACKGROUND

Interior permanent magnet (IPM) synchronous machines are commonly used as electric traction motors in hybrid electric and battery electric vehicles. IPM synchronous machines are energized via a DC power source, typically a rechargeable battery module, in conjunction with a current-controlled voltage source inverter. However, the permanent magnets used in the rotors of such machines can complicate the response taken by a motor controller to a detected motor or drive system fault.

For instance, at higher motor speeds, the rotating magnets can create a back electromagnetic force (EMF) voltage in the motor's stator windings. If switching within the voltage inverter is temporarily disabled in response to a detected fault, the back EMF voltage may cause diodes within the inverter to conduct, thereby allowing electrical current to flow back toward the battery module. This current flow condition is commonly referred to as an "UnControlled Generator" (UCG) state. UCG state characteristics may include the presence of a relatively large amount of regenerative braking torque acting on the machine, as well as conduction of significant electrical current back to the battery module.

To combat this result, as a fault condition remedial action, controllers of IPM-type synchronous machines may short each phase of the multi-phase machine to one or more other phase, such that electrical current may flow from phase to phase instead of flowing back to the battery module. In a three-phase machine, this remedial action is referred to as a "three-phase short." At higher motor speeds, braking torque is relatively low, which is favorable for traction drive applications. The machine impedance will limit the motor currents during a three-phase short operation. Additionally, stator current approaches the characteristic current of the machine for most motor speeds.

SUMMARY

A hybrid vehicle may include a DC electrical bus, an AC electrical bus, a permanent magnet synchronous electric machine (EM), and a power inverter module (PIM). The EM may include a plurality of electrical phase windings disposed on the AC electrical bus, and may be operative to generate an AC electrical signal from a rotational motion. The PIM may be electrically disposed between the DC electrical bus and the AC electrical bus, and may be transitionable between an open-state, a controllable switching-state, and a polyphase short-state.

A controller may be in electrical communication with the PIM, and configured to: command the PIM into the open-state; determine a phase angle of a current of the generated AC electrical signal; and command the PIM into the controllable switching-state. Once in the controllable switching-state, the controller may control the PIM to apply a voltage to the EM that is out-of-phase from the determined phase angle of the generated current, while ramping a magnitude of the applied voltage from a maximum voltage to zero. Once at zero, the controller may command the PIM into the polyphase short-state.

The PIM may include a plurality of semiconductor switches that are each respectively transitionable between an electrically open state, and an electrically closed state. The open-state of the PIM may includes all of the semiconductor switches being electrically open. The controllable switching-state of the PIM may include the semiconductor switches being controllable to convert a DC electrical signal from the DC electrical bus to an AC electrical signal, and to apply the AC electrical signal to the AC electrical bus; and the polyphase short-state of the PIM may include half of the semiconductor switches being closed such that all of the plurality of electrical phase windings are electrically coupled together.

In general, a phase difference between the applied out-of-phase voltage and the determined phase angle of the generated current may be equal to −180 degrees plus a voltage advance. The voltage advance may be a function of a rotational speed of the EM and/or a sampling period of the controller. As such, the controller may further be configured to monitor the speed of the motor. If a speed value is not readily available (e.g. from a sensor), the controller may be configured to derive the speed of the EM by computing a derivative of the determined phase angle of the current of the generated AC electrical signal.

In one configuration, the controller may be configured to ramp a magnitude of the applied voltage from a maximum voltage to zero within a period of time that is between 2 and 3 times the fundamental period of the EM.

Similarly, a method of implementing a remedial short in a rotating polyphase electric machine (EM) includes detecting a fault condition; and initially commanding a power inverter module (PIM) into an electrically-open state. Once in an open state, a controller may determine a phase angle of a current generated by the rotating EM, and may control the PIM to apply a voltage to the EM that is out-of-phase from the determined phase angle of the generated current. The magnitude of the applied voltage signal may ramped from a first voltage to zero over a period of time; whereafter the PIM may be commanded to electrically couple all of the electrical windings of the EM to each other.

The above features and advantages and other features and advantages of the present invention are readily apparent from the following detailed description of the best modes for carrying out the invention when taken in connection with the accompanying drawings.

DETAILED DESCRIPTION

Figure 1:
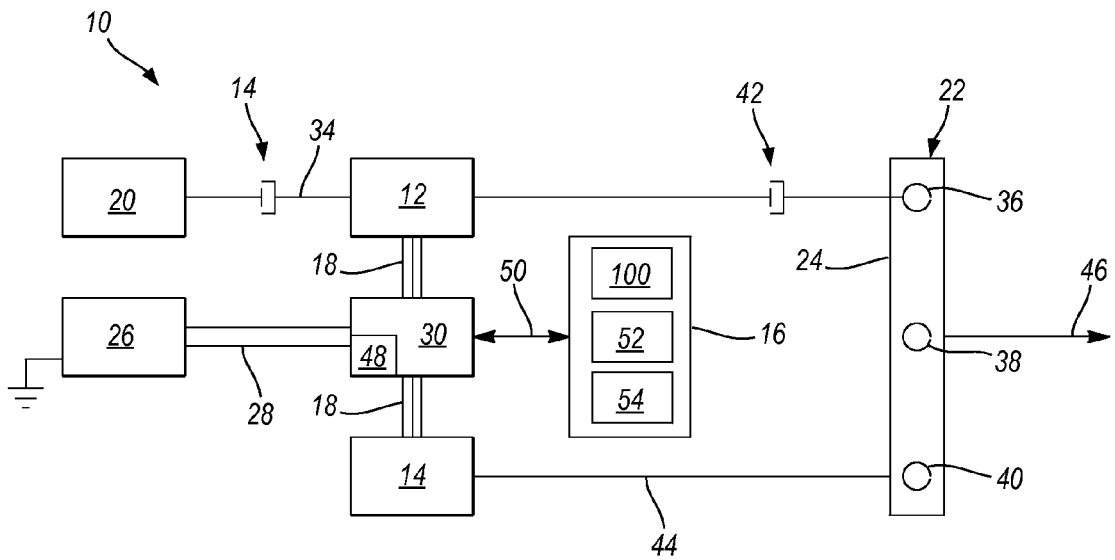
FIG. 1 is a schematic illustration of an example vehicle having a polyphase electric machine, a power inverter module, and a controller which implements a polyphase short state aboard the vehicle as set forth herein.
Figure 3:
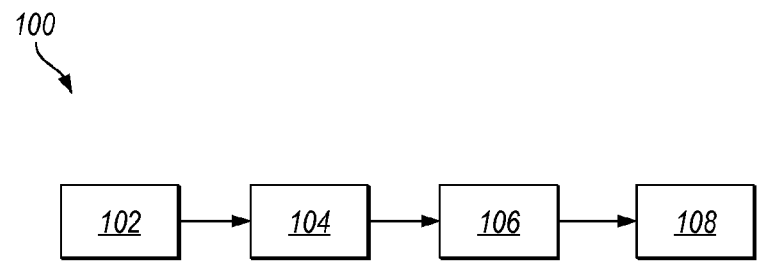
FIG. 3 is a schematic flow diagram illustrating a first configuration of a method of implementing a remedial polyphase short in an electric machine.
Figure 5:
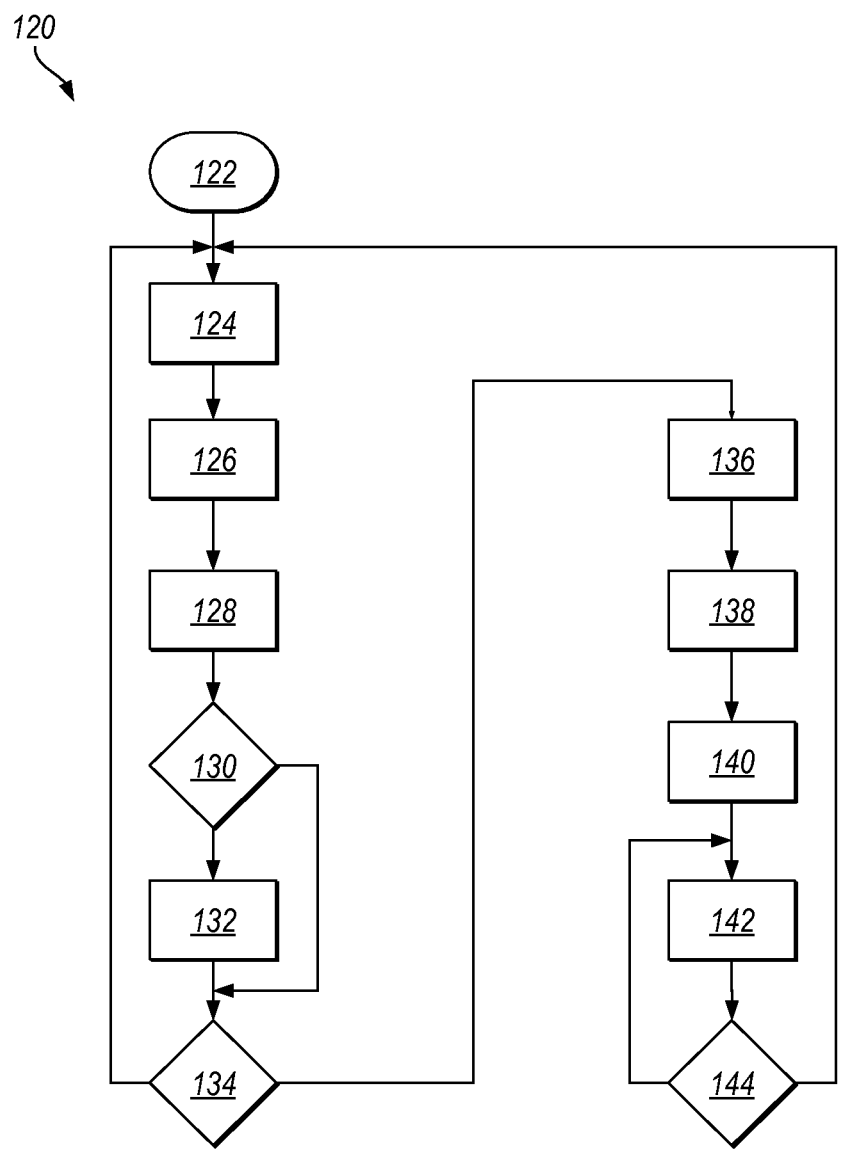
FIG. 5 is a schematic flow diagram illustrating a second configuration of a method of implementing a remedial polyphase short in an electric machine.

Referring to the drawings, an example vehicle 10 is shown schematically in FIG. 1. The vehicle 10 includes first and second motor/generator units 12 and 14 (each being hereinafter referred to simply as a "motor" or an "electric machine"). Both motors 12 and 14 are polyphase interior permanent magnet (IPM) electric machines in the form of electric traction motors. The motors 12, 14 may be rated for approximately 60-180 VAC or more depending on the embodiment. The motor 12 and 14 are controlled via a motor controller 16, e.g., a hybrid control module or a motor control module, which selectively executes code embodying a method 100, examples of which are shown in FIGS. 3 and 5 and described in detail below.

Execution of the method 100 causes the controller 16 to selectively apply a three-phase short to an AC bus 18 of the vehicle 10 in response to a detected electrical, overspeed, and/or other fault in the drive system. While a three-phase short is described hereinafter for illustrative consistency, the present approach is applicable to any polyphase electric machine, e.g., a five-phase machine. There are many possible types of fault conditions that may be detected in the drive system of the vehicle 10, such as rotor position, current, and/or voltage sensor faults or a performance fault such as overcurrent or overspeed, all of which may be monitored by the controller 16.

In the non-limiting example embodiment shown in FIG. 1, the vehicle 10 also includes an internal combustion engine 20 and a transmission 22 having at least one gear set 24. A DC battery module 26 or another suitable DC voltage supply, e.g., a fuel cell, is electrically connected to the first and second motors 12, 14 via the DC bus 28 and a traction power inverter module (TPIM) 30. An optional damping/input clutch 32 may be used to selectively disconnect the engine 20 from the driveline, for instance during a restart of the engine 20 after an auto-stop event.

An output shaft 34 of the engine 20 is connected to the first motor 12, such that when the engine 20 is running, the first motor 12 is energized via engine torque and may be used to generate motor torque, which may be used in turn either to propel the vehicle 10 or to recharge the battery module 26 depending on the transmission operating mode. The second motor 14 may be used to power the vehicle 10 or to charge the battery module 26 regardless of the state of the engine 20. Other embodiments of the vehicle 10 may be envisioned with only one motor 12 or 14, with or without the engine 20, without departing from the intended inventive scope. However, for illustrative consistency, only the two-motor configuration of FIG. 1 will be described hereinafter.

The planetary gear set 24 shown in the example embodiment of FIG. 1 may include first, second, and third nodes 36, 38, and 40. As is understood in the art, such nodes may correspond to a ring gear, sun gear, and planetary gear, either respectively or in another order depending on the embodiment. A rotating clutch 42 may be selectively engaged in some modes to connect the first motor 12 to the first node 36. The second motor 14 may be directly connected to the third node 40 via an interconnecting member 44, i.e., with "directly" meaning that no intervening components are positioned between the second motor 14 and the third node 40. In this particular embodiment, an output member 46 of the transmission 22 may deliver transmission output torque to a set of drive wheels (not shown) to propel the vehicle 10.

An AC bus 18 connects the respective first and second motors 12 and 14 to the TPIM 30. The TPIM 30, as is well known in the art, contains a set of semiconductor switches 48, e.g., IGBTs or MOSFETs, which are rapidly switched via pulse width modulation (PWM) to convert a DC voltage to an AC voltage for use by the respective first and/or second motors 12, 14, and for converting the AC voltage from the motors 12, 14 back into a DC voltage at a level suitable for storage in the battery module 26. Other high-voltage power components such as a DC-DC converter (not shown) may be used to step down the inverted voltage to auxiliary levels, as is well known in the art.

The controller 16 shown in FIG. 1 is in communication with the various components of the vehicle 10, particularly the TPIM 30, the first and second motors 12, 14, and the battery module 26, e.g., over a controller area network (CAN) bus. The controller 16, in executing the present method 100, may selectively implement the polyphase short via transmission of a set of command signals (double headed arrow 50) in response to a detected fault condition. The controller 16 may transition to the polyphase short using the processor 52, which also performs any required motor control algorithms, for example, vector control. The processor 52 outputs gate drive signals directly to the semiconductor switches 48 of the TPIM 30 shown in FIG. 1.

Implementation of the polyphase short state ensures that electrical current is not fed back to the DC bus 28 from the TPIM 30, and that a low braking torque is applied upon such failure at higher motor speeds. Prevention of electrical current backflow to the DC bus 28 helps prevent the TPIM 30 from charging the DC bus 28 to levels that could affect the performance or structural integrity of sensitive electrical components, for instance components of the TPIM 30 itself and/or other sensitive components such as any auxiliary power supplies, diodes, relays, and bypass capacitors. It also prevents flow of uncontrolled and potentially harmful charging current into the battery module 26.

While imposition of a controlled polyphase SHORT state has definite fault remediation advantages, it also may have a number of potential drawbacks. For example, when an IPM-type motor is spinning at a relatively high rate of speed, e.g., 1500 RPM, with no load and with zero current, application of an immediate polyphase short can cause the phase currents of the motor to spike. From this large spike, the envelope of the phase currents may slowly decay, e.g., over tens of milliseconds, to the characteristic current of the motor, however the interim spike may be detrimental to future operation of the motor. The actual decay rate is a function of the parameters of the electric machine, e.g., the motors 12, 14.

Still referring to FIG. 1, the controller 16 may be embodied as one or more hardware devices and associated software. The hardware/software may be contained in a single physical device such as a host machine, or it may be distributed throughout multiple controllers of the vehicle 10. For illustrative simplicity, the controller 16 is shown as one device. However, those of ordinary skill in the art of hybrid powertrains will recognize that control functionality is frequently distributed throughout different hardware/software modules, e.g., a top-level hybrid controller, a motor controller responsible for motor vector control and other motor control functionality, a battery control module, an air conditioning control module, etc. Additionally, while the TPIM 30 and controller 16 are shown separately in FIG. 1, in an actual embodiment the TPIM 30 may be an integrated unit having a DC capacitor, bus bars, IGBTs, gate drives, current sensors, and a control card(s). Therefore, aspects of the present approach related to control of the TPIM 30 may take place at the appropriate level of control within the overall architecture of the controller 16.

The controller 16 of FIG. 1 includes at least a processor 52 and a tangible, non-transitory memory device(s) 54 on which is recorded instructions embodying the various steps of the method 100. The processor 52 may be physically coupled to the memory device 54. Execution of the instructions by the processor 52 causes the controller 16 to implement the transition to a SHORT condition in the manner set forth herein.

The memory device 54 may be any computer-readable medium, including optical and/or magnetic disks and other persistent memory. Instructions, including the command signals (double-headed arrow 50), which include any required gate signals, may be transmitted to the various elements of the vehicle 10 by transmission lines such as coaxial cables, copper wire, fiber optics, and the like.

Figure 2:
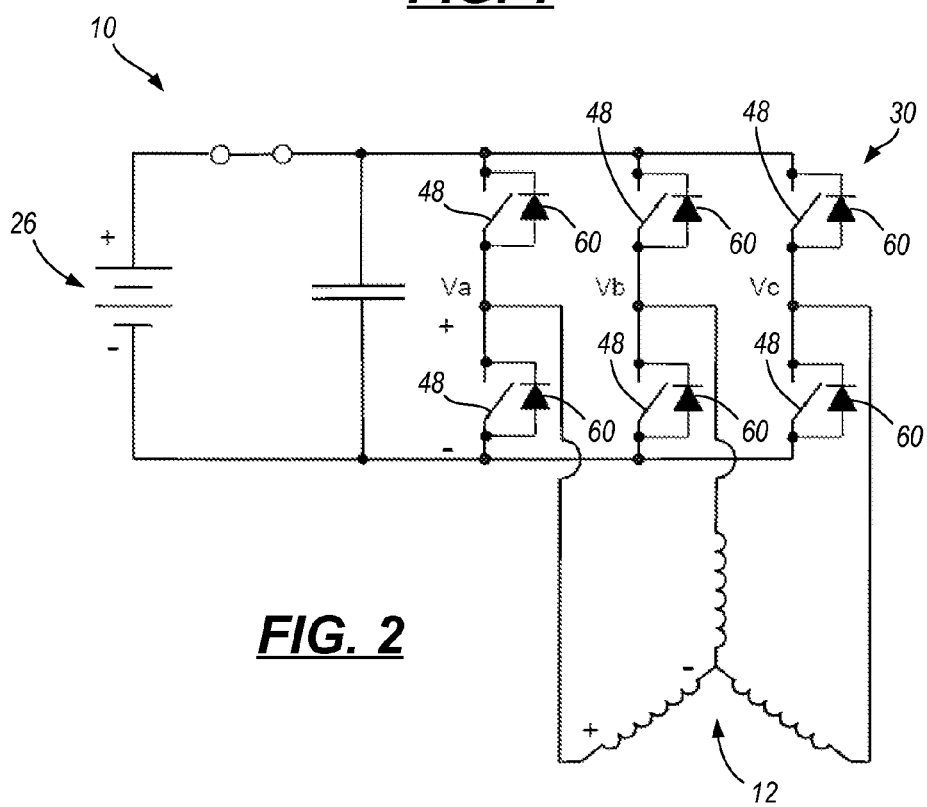
FIG. 2 is a schematic electrical diagram of a 3-phase electric machine, a power inverter module, and a battery module.

FIG. 2 schematically illustrates a simplified electrical diagram of a motor (e.g., motor 12), a TPIM 30, and a battery module 26. As shown, the motor 12 is represented as a three phase balanced load, and the TPIM 30 is represented by a set of semiconductor switches 48 and flyback diodes 60. For a three phase OPEN, all switches 48 are commanded off (i.e., electrically open). In an OPEN state while at low motor speeds, the rectified back-EMF of the motor 12 is lower than the DC link voltage and no current flows. Above some critical speed, the back-EMF exceeds the applied DC link voltage, and current flows back thru the flyback diodes 60 to the battery module 26 (e.g., UCG mode). The critical speed where UCG mode begins is a function of the DC bus voltage and magnet flux.

Once the system enters the UCG mode, the voltage that is generated by the 3-phase machine is typically 150-210 degrees out of phase from the generated current (i.e., 180 degrees+/−30 degrees). More specifically, the phase difference between the generated voltage and current signals may resemble a saw-tooth wave that linearly translates between the extremes, with a discontinuity every 60 degrees. Additionally, when the generated DC voltage component approaches zero in UCG mode (or if the angular motor speed approaches infinity), the UCG current approaches a value known as the machine characteristic current (which resembles a polyphase SHORT state).

Emulated UCG During Transition to Short

To avoid the large transient current spike during an abrupt transition to short, the controller 16 may instruct the TPIM 30 to emulate UCG mode, while ramping the applied voltage signal from a six-step voltage (i.e., the maximum voltage capable of being provided by the TPIM 30) to zero. In general, UCG mode may be emulated by controlling the TPIM 30 to provide a voltage signal that is 180 degrees out of phase from the UCG current.

As schematically illustrated in FIG. 3, one configuration of the proposed method 100 begins at 102 when the controller 16 opens all switches 48 to momentarily place the motor in an UCG state. Once placed in this state, the controller 16 may make an initial estimation (at 104) of the magnitude and phase angle of the current flowing to the battery module 26.

At step 106, the controller 16 may compute a desired voltage-phase for a to-be-applied voltage signal according to the following equation:

$$\angle V = \angle I - 180° + \theta_{adv}$$

where:

$$\theta_{adv} = 1.5 * T_{samp} * \omega_e$$

and where $T_{samp}$ is the sampling period that the processor uses to sample the current signal, and $\omega_e$ is the rotational speed of the motor.

As represented above, the computed voltage-phase may be 180 degrees out of phase from the monitored current phase, plus a voltage-advance term $\theta_{adv}$. The voltage advance term may compensate for sampling and computational processing delays that could cause the signal to slightly lag the true 180 degree offset. Said another way, in the time it takes the controller 16 to sample the current, compute the next voltage phase, and output an updated voltage signal, the current signal would have advanced (proportional to the rotational speed of the motor). The "1.5" multiple may be included if the commanded voltage signal is a center-weighted average of the PWM voltage signal across the entire time-step, whereas the current sample is typically captured at the beginning of the time-step. In this manner, the phase of the voltage signal may be advanced to the center of the period where it will be output.

Once the voltage phase is computed in step 106, the controller 16 may instruct the TPIM 30 (via command signals 50) to output a PWM voltage signal having a voltage magnitude of the six-step voltage with the phase computed above (step 108). The controller 16 may continuously update the provided PWM voltage signal while ramping the magnitude of the signal from the six step voltage to zero. Once the magnitude of the voltage reaches zero, the controller 16 may command the TPIM 30 to initiate the polyphase SHORT.

Optimal Transition Time Determination

Figure 4:
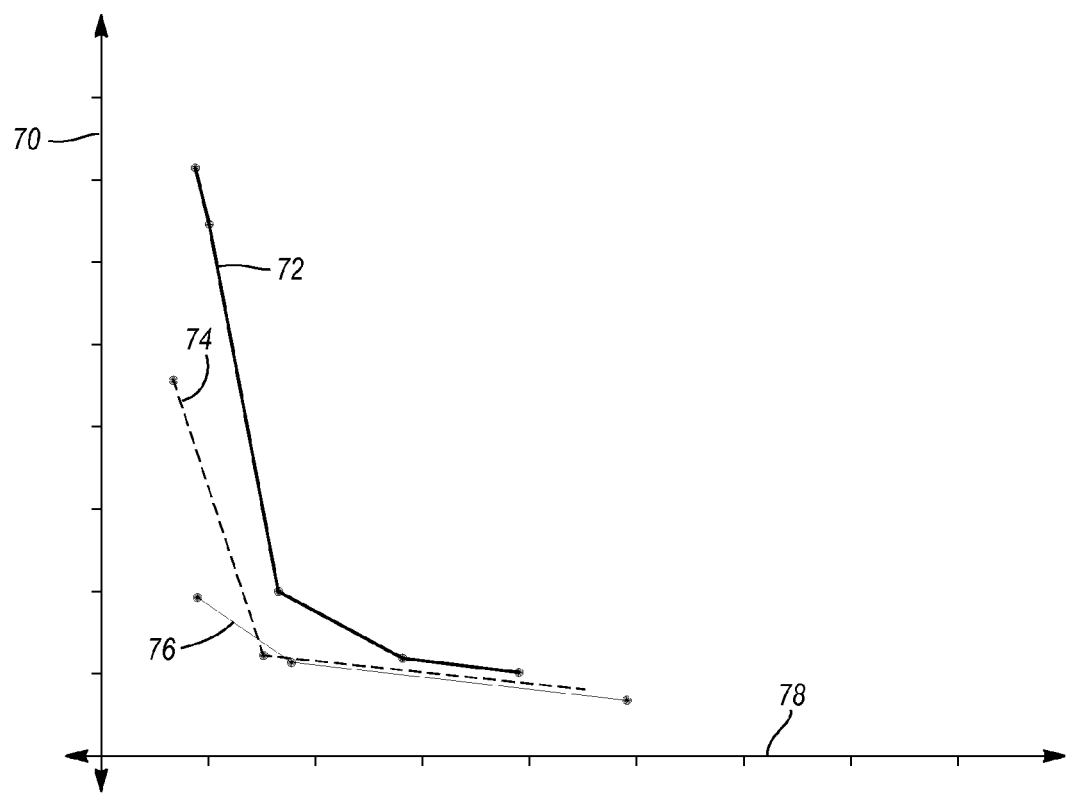
FIG. 4 is an amplitude time plot describing current overshoot as a function of motor fundamental period for a plurality of motor speeds.

FIG. 4 schematically illustrates motor current percent-overshoot 70 (% OS) for three motor speeds 72, 74, and 76 as a function of transition time 78 from emulated six-step UCG to zero volt UCG. As shown, the percent-overshoot 70 generally represents the peak d-axis current with respect to steady-state SHORT current, while the transition time 78 for each motor speed 72, 74, and 76 is normalized to the motor fundamental period $T_e$ (i.e., a function of motor speed). As shown, the optimal transition time, which is defined herein as being the fastest available transition time still having an acceptable current overshoot, can be expressed as a function of the motor electrical period, which in turn is proportional to motor speed.

FIG. 4 illustrates the fact that motor current peak overshoot can be limited to under approximately 10% if the transition time is set to approximately 2-3 times the motor fundamental electrical period. Therefore, the controller 16 of FIG. 1, in executing the method 100, can use the measured motor speed, if such data is available, in order to determine the optimal transition time, and can set the transition time to the desired value to achieve a specific overshoot value.

For example, rise time ($t_r$) can be set to 300% of the fundamental electrical period to maintain approximately 10% overshoot on the current transient during the transition to the SHORT state. At low motor speeds, the fundamental period becomes prohibitively long. However, under these conditions motor dynamics become more damped, and thus current overshoot becomes less of a concern. Therefore, transition time may be limited to a maximum value, for example 50 ms, to avoid a prolonged transition while maintaining acceptable levels of current overshoot.

Speed Estimation for Failed Speed Sensor Condition

Motor speed is not available in some cases. The controller 16 may estimate the motor speed in this instance. To do so, at least two functional phase current sensors are required. For a Y-connected motor with open neutral, the third phase current can be computed as the negative of the sum of the other two, i.e., $i_c = -i_a - i_b$, as is well known in the art.

The currents of the ABC stationary frame for the motor being controlled, e.g., the second motor 14, can be transformed by the controller 16 of FIG. 1 into the equivalent αβ stationary frame quantities as follows:

$$\begin{bmatrix} \alpha \\ \beta \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} a \\ b \\ c \end{bmatrix}$$

For a balanced system, a+b+c=0, and therefore:

$$\alpha = a$$

$$\beta = \frac{b-c}{\sqrt{3}}$$

The time derivative of the angle of the resulting current vector may be used to estimate motor speed. Since the derivative term is inherently noisy, the signal can be averaged over a suitable time period, for example 3 ms. The resulting estimated speed calculation provides adequate accuracy for the proposed method 100. This estimation approach is used by the controller 16 only when the speed sensor is faulted and current is flowing in the controlled motor.

The αβ currents in the above equation are sinusoidal quantities with a 90 degree phase shift. The angle of the stator current vector γ can be computed as follows:

$$\gamma = \tan^{-1}\left(\frac{\beta}{\alpha}\right)$$

The instantaneous motor angular velocity, $\omega_r$, can then be computed as the time derivative of the stator current position γ, which can be computed as the change in position over consecutive switching periods:

$$\omega_r = \dot{\gamma} = \frac{\gamma[k] - \gamma[k-1]}{T_{SW}}$$

where γ[k] is the current vector angle during the latest sample period, and γ[k−1] is the current vector angle during the previous sample period. Since the calculation of the instantaneous motor angular velocity is susceptible to noise, the result may be passed through a moving average filter to smooth the result and provide acceptable accuracy with minimal computational overhead.

Execution of the method 100 by the controller 16 shown in FIG. 1 has several possible advantages. One of the highest performing magnets in use today is the rare earth NeFeB-type. Several additives are used to enhance the properties of this magnet, with one of these being Dysprosium. Reducing the large transient negative d-axis current per the method 100 may enable a reduction in Dysprosium content without demagnetization, thereby reducing motor cost. Similar results are possible in lower cost ferrite magnets.

FIG. 5 generally illustrates a method 120 for implementing a remedial short in a polyphase electric machine that may be similar to (and used in place of) the above-described method 100 provided in FIG. 3. The method 120 begins at step 122 when a fault is detected within the controller, motor, or elsewhere that may require remedial measures be taken. In step 124, the controller 16 may transmit a set of command signals 50 to the TPIM 30 to instruct all semiconductor switches 48 to open. By doing so, the controller 52 may place the system in UCG mode, where the only current flow may originate from the motor.

In step 126, the controller 16 may compute $I_\alpha$ and $I_\beta$ from, for example, one or more current sensors in communication with the a, b, and/or c phases of the three-phase electric machine. These computed values may be a vector expression of the power being generated by the electric machine. In step 128, the controller 16 may compute the phase angle and absolute magnitude of the generated current.

Once the generated current is fully quantified and understood, the controller 16 may inquire whether a valid motor speed measurement is known in step 130. If the speed measurement is unavailable, or believed to be unreliable the controller 16 may compute the motor speed, in step 132, using a filtered derivative of the phase angle of the current that was computed in step 128. If the speed measurement is available and trustworthy, then the method 120 may skip step 132.

The method 120 may then proceed to step 134, where the absolute magnitude of the generated current is compared to a threshold. If the current is less than the threshold, the controller 16 may conclude that a polyphase short is not required, and may continue monitoring. If, however, the current exceeds the threshold, the controller 16 may proceed by computing a voltage advance $\theta_{adv}$ in step 136, as described above.

In step 138, the controller 16 may initiate a PWM control signal, and immediately enter an Emulated UCG mode in 140. In the Emulated UCG mode, the controller 16 may control the TPIM 30 to output a voltage signal with a phase 180 degrees apart from the current phase computed in step 128, plus the voltage advance computed in step 136. The magnitude of the generated voltage signal may begin at a six-step voltage, and may transition to zero volts over a time period that is dependent on the speed of the motor. For example, in one configuration, the transition time may be between two and three times the fundamental period of the motor.

Once the Emulated UCG voltage has been ramped to zero volts in step 140, the controller 16 may command a polyphase short that electrically couples each respective phase of the motor to every other phase. In step 142, the controller 16 may monitor the generated current at each phase of the motor, and compare the current magnitude to a threshold (step 144). If the generated current exceeds the threshold, the TPIM 30 may remain short. If the generated current falls below the threshold, the TPIM 30 may transition back to full-open.

While the best modes for carrying out the invention have been described in detail, those familiar with the art to which this invention relates will recognize various alternative designs and embodiments for practicing the invention within the scope of the appended claims.

The invention claimed is:

1. A system comprising:
   a DC electrical bus;
   an AC electrical bus;
   a permanent magnet synchronous electric machine (EM) having a plurality of electrical phase windings disposed on the AC electrical bus, the EM being operative to generate an AC electrical signal from a rotational motion;
   a power inverter module (PIM) electrically disposed between the DC electrical bus and the AC electrical bus, the PIM being transitionable between an open-state, a controllable switching-state, and a polyphase short-state; and
   a controller in communication with the PIM, the controller configured to:
   command the PIM into the open-state;
   determine a phase angle of a current of the generated AC electrical signal;

command the PIM into the controllable switching-state;
control the PIM to apply a voltage to the EM that is out-of-phase from the determined phase angle of the generated current;
ramp a magnitude of the applied voltage from a maximum voltage to zero; and
command the PIM into the polyphase short-state.

2. The system of claim 1, wherein the PIM includes a plurality of semiconductor switches that are each respectively transitionable between an electrically open state, and an electrically closed state;
wherein the open-state includes all of the semiconductor switches being electrically open;
wherein the controllable switching-state includes the semiconductor switches being controllable to convert a DC electrical signal from the DC electrical bus to an AC electrical signal, and to apply the AC electrical signal to the AC electrical bus; and
wherein the polyphase short-state includes half of the semiconductor switches being closed such that all of the plurality of electrical phase windings are electrically coupled together.

3. The system of claim 1, wherein a phase difference between the applied out-of-phase voltage and the determined phase angle of the generated current is equal to −180 degrees plus a voltage advance; and
wherein the voltage advance is a function of a rotational speed of the EM.

4. The system of claim 3, wherein the voltage advance is additionally a function of a sampling period of the controller.

5. The system of claim 3, wherein the controller is configured to monitor the speed of the motor.

6. The system of claim 3, wherein the controller is configured to derive the speed of the EM by computing a derivative of the determined phase angle of the current of the generated AC electrical signal.

7. The system of claim 1, wherein the controller is configured to ramp a magnitude of the applied voltage from a maximum voltage to zero within a period of time that is between 2 and 3 times the fundamental period of the EM.

8. The system of claim 1, wherein the EM includes three electrical phase windings; and wherein the maximum voltage is a six-step voltage.

9. A method of implementing a remedial short in a rotating polyphase electric machine (EM) in response to a fault condition, the method comprising:
detecting a fault condition;
commanding a power inverter module (PIM) into an electrically-open state;
determining a phase angle of a current generated by the rotating EM;
controlling the PIM to apply a voltage to the EM that is out-of-phase from the determined phase angle of the generated current;
ramping a magnitude of the applied voltage from a first voltage to zero over a period of time;
commanding the PIM to electrically couple each of a plurality of electrical windings of the EM to each other.

10. The method of claim 9, wherein controlling the PIM to apply a voltage to the EM that is out-of-phase from the determined phase angle of the generated current includes:
determining a voltage advance using a sampling frequency and a speed of rotation of the EM;
calculating a phase angle for the applied voltage, such that the phase difference between the applied voltage and the generated current is 180 degrees plus the determined voltage advance.

11. The method of claim 9, wherein the EM is a three-phase permanent magnet synchronous electric machine; and
wherein the first voltage is a six-step voltage.

12. The method of claim 9, wherein the period of time is between 2 and 3 times the fundamental period of the rotating EM.

13. The method of claim 9, further comprising determining a rotational speed of the EM by computing a derivative of the phase angle of the current generated by the rotating EM.

* * * * *